INVENTORS,
LEO A. MILLER
JACK D. TERRANA
BY McLean, Morton & Boustead
ATTORNEYS.

United States Patent Office 3,477,815
Patented Nov. 11, 1969

3,477,815
PROCESS FOR RECOVERING SULFUR
DIOXIDE FROM FLUE GAS
Leo A. Miller, Lakeland, and Jack D. Terrana, Tampa,
Fla., assignors, by mesne assignments, to Wellman-Lord,
Inc., Lakeland, Fla., a corporation of Florida
Filed Nov. 15, 1966, Ser. No. 594,432
Int. Cl. C01b 17/56
U.S. Cl. 23—178                                                  11 Claims

ABSTRACT OF THE DISCLOSURE

A sulfur dioxide-containing gas, such as a flue gas, is scrubbed with an aqueous solution of an alkali metal or alkaline earth metal sulfite, e.g. sodium sulfite, to absorb the $SO_2$ an form the bisulfite. The spent absorbing solution is conveyed to a desorption zone where it is heated to effect reversion of some, e.g. 50 to 70%, of the bisulfite back to the sulfite, water and $SO_2$. That portion of the bisulfite which is not decomposed in the heating step is reacted with the corresponding metal carbonate to yield more metal sulfite, water and carbon dioxide. The resulting metal sulfite solution is then recycled to the absorption zone.

---

Figure 1:
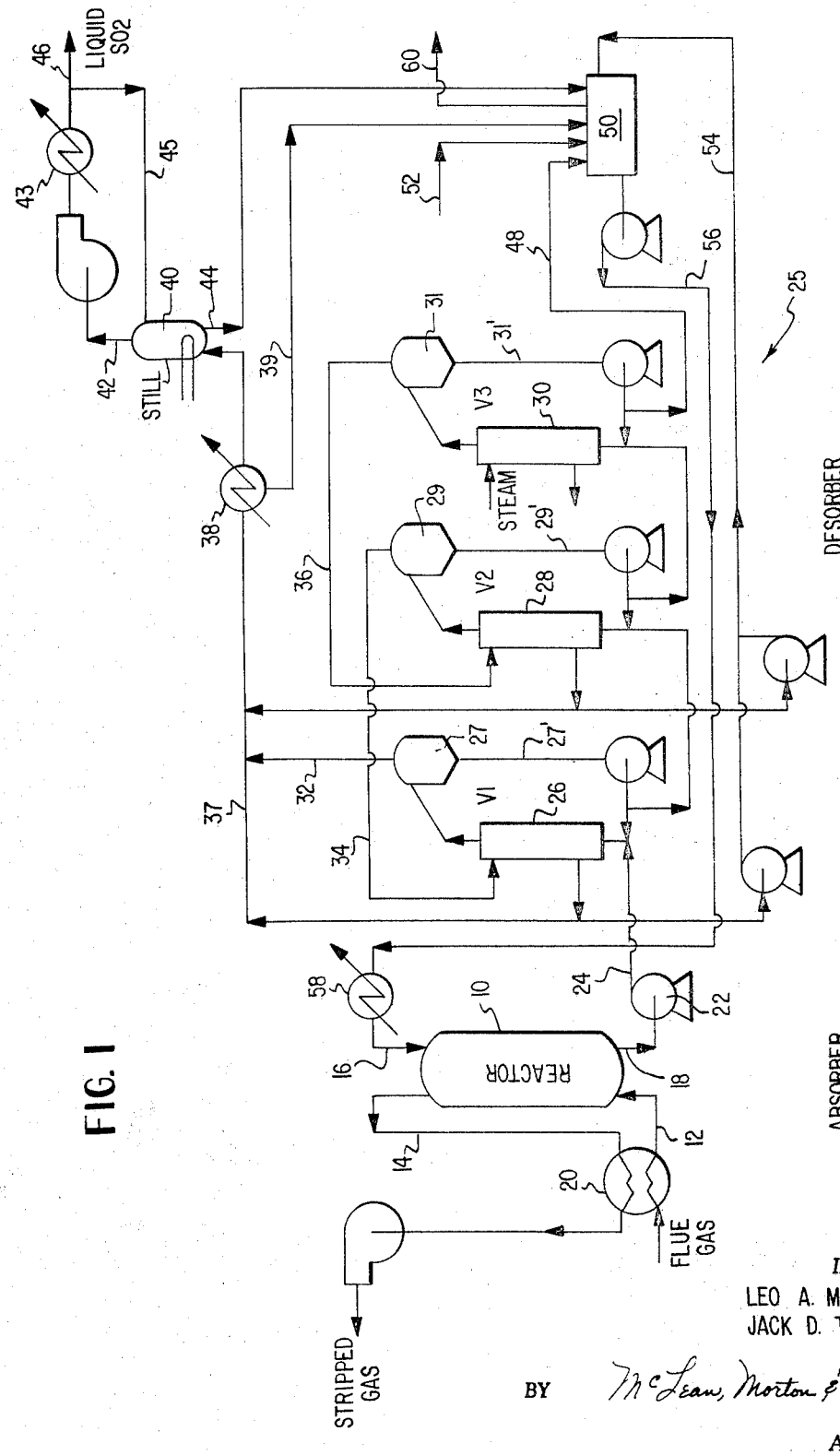

This invention relates to the recovery of sulfur dioxide from gases containing the same, and more particularly, to a process for the recovery of sulfur dioxide from waste gases containing small concentrations thereof by reaction with, for example, sodium sulfite to produce sodium bisulfite and subsequent decomposition of the bisulfite to release sulfur dioxide.

According to existing practice, sulfur dioxide can be recovered from gases containing large concentrations thereof, e.g., 5 to 20 weight percent sulfur dioxide by cooling and scrubbing with water which dissolves the sulfur dioxide and then heating the resulting solution to drive off the sulfur dioxide. Gases containing such concentrations of sulfur dioxide can be produced, for example, by burning sulfur or sulfur-bearing ores with air. This process, however, requires large quantities of water and fuel and is correspondingly expensive since the solubility of sulfur dioxide in water is not very high and depends upon the percentage of sulfur dioxide in the gases and the temperature of the water used for absorption. Accordingly, this process is generally unsuitable for use with gases containing small concentrations of sulfur dioxide.

Sulfur dioxide is, however, found in large amounts as a constituent of many waste gases such as smelter gases, offgases from many chemical plants, and stack or furnace gases, from coal-burning furnaces such as used in electric power plants, although its concentration in such gases is often less than 1 percent by weight. For example, a modern electric power plant of 1,350,000 kw. capacity will burn about 15,000 ton of coal per day. Much coal contains about 3.5 percent sulfur, or even more. The emission of sulfur dioxide from a plant of this size using such coal would then amount to about 1,000 tons per day, although the concentration of sulfur dioxide in the stack gases would be very low, on the order of 0.3 percent. This invention permits recovery of such small amounts of sulfur dioxide from gases, e.g. waste gases, although it is not limited thereto and can be used to recover the much larger concentrations from such gases as discussed above.

In accordance with this invention the sulfur dioxide in the gas is reacted with an alkali or alkaline earth metal sulfite, e.g. sodium sulfite, potassium sulfite, calcium sulfite, etc., in aqueous solution to form the corresponding bisulfite and subsequently the bisulfite is decomposed to produce an aqueous solution of the sulfite and sulfur dioxide and water vapor which are drawn off and either colled and compressed to provide a liquid product or sent to a sulfuric acid plant. The sulfite is recycled to the reaction zone wherein additional sulfur dioxide is absorbed by reaction with the sulfite.

The present invention is based upon the recognition that the reaction of sulfur dioxide and a metal sulfite in aqueous solution to produce the metal bisulfite is reversible upon control of the temperature. For example, with sodium sulfite, the two reactions which are utilized in this invention are:

(I) $Na_2SO_3 + SO_2 + H_2O \xrightarrow{180°F.} 2NaHSO_3$ (II) $2NaHSO_3 \xrightarrow{230°F.} Na_2SO_3 + H_2O + SO_2$ For reaction of the metal sulfite and sulfur dioxide, e.g. Reaction I, to proceed, the temperature should be maintained above the temperature at which $SO_2$ is absorbed by reaction with the metal sulfite, preferably above about 100° F., and below the temperature, e.g. about 200° F. at which $SO_2$ is driven off such as by Reaction II. Preferably, the temperature is maintained below about 190° F., e.g. at about 180° F. or 185° F., since above this temperature Reaction I slows to a point where $SO_2$ will not be readily absorbed into solution. Decomposition of the metal bisulfite liquid, e.g. according to Reaction II is carried out at a temperature of above about 230° F., and up to about 600° F., preferably between about 300° and 400° F. Since some oxygen will be present in most flue gases, it is desirable to keep the decomposition temperature below the temperature at which the sulfite and oxygen react to produce the corresponding sulfate, e.g. below about 600° F. Oxidation inhibitors such as hydroquinone can be used to prevent oxidation. When using such an inhibitor and sodium sulfite, the temperature is preferably below about 400° F.

This invention will be described hereinbelow with reference to the use of sodium sulfite although it is not so limtied. In general, therefore, an aqueous solution of sodium sulfite is fed to a reaction zone through which a gas containing sulfur dioxide is passed. This solution becomes saturated with sodium bisulfite in the reaction zone and is withdrawn from this zone and passed to a decomposition zone. The actual removal of $SO_2$ from the bisulfite and its conversion to the sulfite is accomplished by heating the solution of bisulfite, e.g. sodium bisulfite to above the boiling point of water in the solution and the decomposition temperature to remove substantial amounts of water and most of the $SO_2$. After most of the $SO_2$ is removed, i.e. about 50 to 70%, particularly about 60%, the corresponding metal carbonate, e.g. sodium carbonate is added to the solution to drive Reaction I to completion so that no $SO_2$ is lost and an essentially 100% recycle stream of sodium sulfite is produced. The reaction upon the addition of sodium carbonate is:

(III) $2NaHSO_3 + Na_2CO_3 \rightarrow 2Na_2SO_3 + H_2O + CO_2$

Sufficient sodium carbonate is added to bring the concentration of sodium sulfite in the resultant solution up to at least about 70 weight percent and preferably above about 80 weight percent. This sodium sulfite solution is then recycled to the reaction zone.

Figure 2:
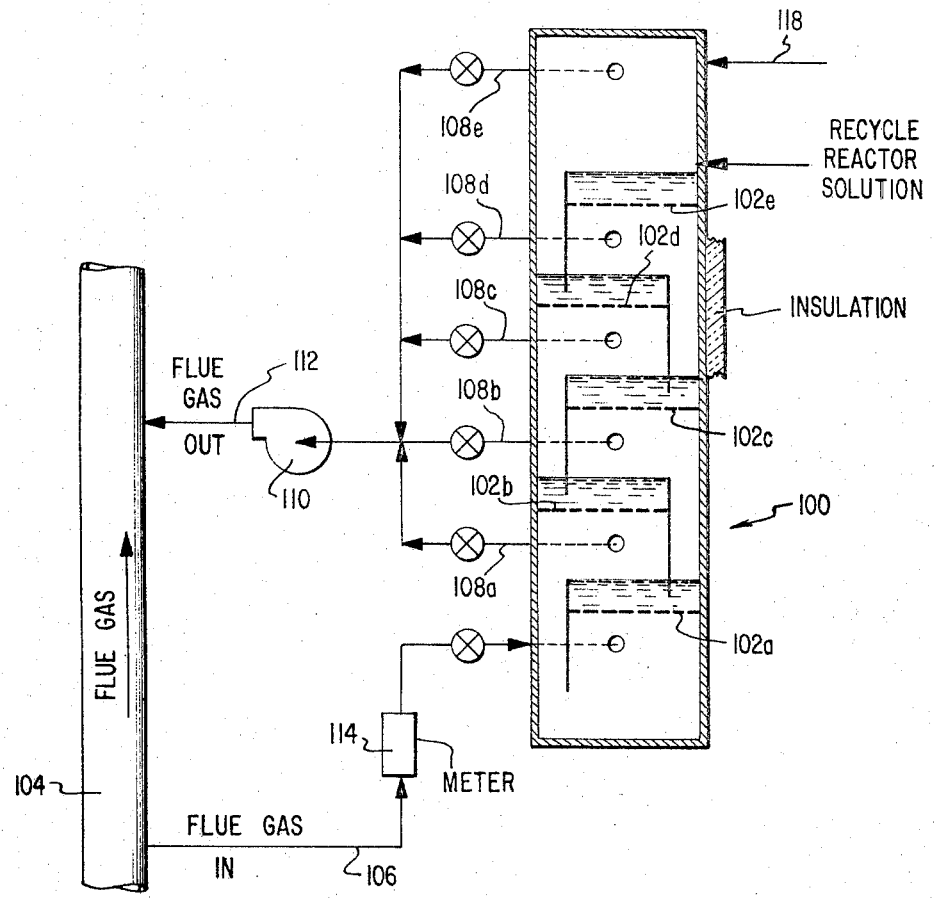

The present invention will be more fully understood from the following detailed description thereof when read in conjunction with the accompanying drawings in which:

FIGURE 1 is a flow sheet of the system for the recovery of $SO_2$ in accordance with this invention, and FIGURE 2 illustrates in detail a suitable eractor for use with Reaction I.

Referring now to FIGURE 1, a gas stream containing $SO_2$, e.g. flue gas from a power plant containing about 0.3 mol. percent $SO_2$, is introduced into reactor 10 through line 12. The $SO_2$ is absorbed from the flue gas in reactor 10 by reaction with sodium sulfite and water which are introduced into reactor 10 through line 16 to produce an aqueous sodium bisulfite solution. The bisulfite solution is removed from reactor 10 through line 18 and the stripped gas is removed through line 14. The flue gas in line 12 is passed in countercurrent heat exchange relationship with the stripped gas in heat exchanger 20.

Reactor 10 is, for example, a column designed for intimate contact of counter-currently flowing gas and liquid streams such as a packed tower or a plate tower containing bubble trays or sieve plates 102 such as shown in FIGURE 2. Tower 100 of FIGURE 2 has five sieve plates 102a through e although, of course, any desired number can be used. Flue gas is introduced into tower 100 through line 106 from flue gas line 104 and passes upwardly through plates 102 counter-currently to the downwardly flowing aqueous sodium sulfite solution. The stripped gas is removed from the desired point in tower 100 via lines 108a, b, c, d and/or e and reintroduced into line 104 through line 112 by blower 110. Line 104 can, for example, be a feed line for a stack. Meter 114 in line 106 can be used to regulate the introduction of flue gas through line 106, if desired, to insure complete removal of $SO_2$. Tower 100 is jacketed and insulated. Steam can be introduced into the jacket through line 118 to assist in controling the temperature of the solution in the tower.

The solution in the reaction zone, i.e. reactor 10 is generally maintained at a temperature sufficient to accomplish Reaction I above and insufficient to decompose the sodium bisulfite produced therein according to Reaction II, i.e. below about 230° F. Temperatures of about 100° F. to about 180° F., or 190 F. are suitable for the reaction zone since above this level the rate of Reaction I slows and sulfur dioxide does not go readily into solution. Additionally, since the flue gas is passed upwardly countercurrent to the aqueous sodium sulfite solution, it is desirable to maintain the temperature of the gases at a temperature sufficiently high that they will rise in the reaction zone, e.g. about 185 F.

The product of the reaction zone is preferably a saturated aqueous solution of sodium bisulfite, and, accordingly, the concentration of the solution is desirably maintained at just below saturation by the addition of sufficient water to avoid precipitation of sodium bisulfite. The amount of solids in the aqueous bisulfite solution will vary depending upon the temperature but at about 180° F. there will generally be between about 30 and 35 weight percent solids in the solution of which about 30 to 50 percent is sodium bisulfite and 50 to 70 percent is sodium sulfite. The sodium sulfite solution introduced into the reaction zone is preferably a recycle stream and, generally contains about 20 to 30 weight percent solids of which above about 80 percent, and preferably 100 percent, is sodium sulfite and the balance essentially sodium bisulfite. This recycle stream is preferably a saturated solution of sodium sulfite and the temperature is controlled to avoid upsetting the requirements of reactor 10. The temperature of the recycle stream is typically about 90° to 125° F.

The aqueous sodium bisulfite solution removed from reactor 10 through line 18 is pumped by 22 through line 24 to the desorption zone 25 which functions to remove water and a portion of the $SO_2$. Desorption zone 25 can, for example, be a triple effect evaporator having effects V–1, V–2 and V–3, as shown, the temperatures of which are controlled, respectively, by heat exchangers 26, 28 and 30. The temperature and residence time of the bisulfite solution in desorption zone 25 is controlled to boil the water out of the solution and partially decompose the bisulfite, e.g. between about 230° and 600° F., particularly 300° and 400° F. as discussed above. The bisulfite solution in line 24 is introduced into effect V–1 and passes through heat exchanger 26 into separator 27 where water vapor and any $SO_2$ therein are separated from the solution. Vapors are removed from separator 27 through line 32 and the remaining solution is removed through line 27'. A portion of the remaining solution is recycled. A substantial portion of the remaining solution is then passed through heat exchanger 28 of effect V–2 into separator 29. Vapors are removed from separator 29 through line 34. The solution from effect V–2 passes from separator 29 through line 29' and heat exchanger 30 into separator 31 of effect V–3. Vapors are removed from separator 31 through line 36. The vapors removed from effects V–2 and V–3 through, respectively, lines 34 and 36 are conveniently used to provide heat for heat exchangers 26 and 28 of effects V–1 and V–2. If desired, the first effect V–1 can be used to remove water with decomposition occurring primarly in the latter effects by controlling the temperature therein. For example, the temperature in effect V–1 can be maintained above the boiling point of water in the solution and below the decomposition temperature, i.e. 230° F., and effects V–2 and V–3 can be maintained above the decomposition temperature.

The water vapor and $SO_2$ produced in effects V–1, V–2 and V–3 and withdrawn through lines 32, 34 and 36, respectively, are combined in line 37 and passed through a partial condenser 38 which separates entrained material and some of the water vapor. This separated material is passed to a hold-up tank 50 through line 39. The gases remaining in line 37 then pass through drying still 40 for separation of the $SO_2$ and water; the $SO_2$ being removed overhead through line 42 and the water being removed out the bottom through line 44. $SO_2$ in line 42 is cooled in heat exchanger 43 and liquid $SO_2$ is recycled to still 40 through line 45. $SO_2$ product is removed through line 46.

The solution removed from the desorption zone 25 after separation of $SO_2$ and water vapor, i.e. the solution removed from separator 31 through line 31' is an aqueous solution of sodium bisulfite and sodium sulfite. As mentioned above, the temperature of the desorption zone is preferably controlled to decompose sodium bisulfite in an amount sufficient to recover about 50 to 70%, particularly 60%, of the $SO_2$ from the bisulfite solution in line 24. The bisulfite-sulfite solution removed through line 31' is passed through line 48 to hold-up tank 50. Sodium carbonate is added to tank 50 through line 52 and Reaction III described above carried out to drive the reaction of $SO_2$ to completion and produce an aqueous sodium sulfite solution. Tank 50 collects all the recycle streams, e.g. the spent sodium bisulfite solution in line 48, condensates from the heat exchangers of effects V–1, V–2 and V–3 in line 54, condensate from still 40 in line 44 and condensate from heat exchanger 38 in line 39. The solution from tank 50 is recycled to reactor 10 through line 56 and heat exchanger 58 and introduced into reactor 10 through line 16. If desired, make-up water, sodium sulfite, etc. can be introduced into tank 50. Vent 60 releases gases, i.e. $CO_2$ produced in tank 50.

The following example, with reference to the above description, further illustrates the invention. A flue gas from coal-burning furnaces used in an electric power plant is scrubbed in an absorption tower or reactor 10 with an aqueous slurry of sodium sulfite containing initially about 25 weight percent solids including about 90 percent sodium sulfite, the remainder being essentially sodium bisulfite. The temperature of the solution withdrawn from reactor 10 is about 185° F. Typical composition of the flue gas in mole percent is: sulfur dioxide, 0.3; oxygen, 3.4; carbon dioxide, 14.2; nitrogen, 76.1; water, 6.0; and sulfur trioxide, trace. With a residence time of about 8 to 12 seconds per plate about 90 to 95% of the $SO_2$ is removed from the flue gas. The solution removed from tower 10 contains about 30 weight percent solids of which about 40 percent is sodium bisulfite. This solution is heated to about 225° F. in a triple effect evaporator for a residence time sufficient to decompose about 60% of the sodium bisulfite and then the solution is passed to a hold-up tank where sodium carbonate is added until carbon dioxide ceases. The $SO_2$ evolved in the evaporator is collected. The aqueous solution of sodium sulfite produced in the hold-up tank is recycled to the absorption tower.

It is claimed:

1. A process for the recovery of sulfur dioxide from a gas containing the same comprising contacting said gas containing sulfur dioxide and an aqueous solution of the sulfite of a metal selected from the group consisting of alkali metals and alkaline earth metals in a reaction zone to produce an aqueous solution of the bisulfite of said metal, said reaction zone being maintained at a temperature below the temperature at which the metal bisulfite decomposes to the metal sulfite, sulfur dioxide and water, recovering the metal bisulfite solution and passing the solution through a desorption zone maintained at a temperature above the temperature at which the metal bisulfite decomposes to the metal sulfite, sulfur dioxide and water to at least partially decompose the metal bisulfite, adding the carbonate of said metal to the resulting metal sulfite-metal bisulfite solution to convert the remaining metal bisulfite to the metal sulfite, recycling the resulting metal sulfite solution to said reaction zone, and recovering the sulfur dioxide produced upon decomposition of the metal bisulfite.

2. The process of claim 1 wherein said reaction zone temperature is between about 100° F. and 230° F.

3. The process of claim 1 wherein said desorption zone temperature is between about 230° F. and 400° F.

4. The process of claim 1 wherein approximately 50 to 70% of the absorbed sulfur dioxide is removed in said desorption zone.

5. The process of claim 1 wherein the desorption zone is a multiple effect evaporator, wherein the first effect of which is maintained at a temperature above the boiling point of water in the aqueous metal bisulfite solution and below the temperature at which the metal bisulfite decomposes and wherein the remaining effects are operated above the temperature at which the metal bisulfite decomposes.

6. A process for the recovery of sulfur dioxide from a gas containing the same comprising contacting said gas containing sulfur dioxide and an aqueous solution of sodium bisulfite in a reaction zone to produce an aqueous solution of sodium bisulfite, said reaction zone being maintained at a temperature below the temperature at which sodium bisulfite decomposes to sodium sulfite, sulfur dioxide and water, recovering said solution of sodium bisulfite and passing the solution through a desorption zone maintained at a temperature above the boiling point of water in the solution and above the temperature at which sodium disulfite decomposes to sodium sulfite, sulfur dioxide and water, to at least partially decompose the sodium bisulfite, recovering the resulting sulfur dioxide, adding sodium carbonate to the resulting sodium sulfite-bisulfite solution to convert the remaining sodium bisulfite to sodium sulfite, and recycling the resulting sodium sulfite solution to said reaction zone.

7. The process of claim 6 wherein said reaction zone temperature is between about 100° F. and 190° F. and said desorption zone temperature is between about 300° F. and 400° F.

8. The process of claim 6 wherein the temperature of reaction zone is between about 100° F. and 230° F. and the temperature of said desorption zone is between about 230° F. and 400° F.

9. The process of claim 8 wherein approximately 50 to 70% of the absorbed sulfur dioxide is removed in said desorption zone.

10. The process of claim 8 wherein the aqueous solution of sodium sulfite added to the reaction zone is a substantially saturated solution, the solids content of which contains about 80% to 100% sodium sulfite with the balance being essentially sodium bisulfite.

11. The process of claim 10 wherein the aqueous solution of sodium bisulfite produced in said reaction zone contains about 30 to 35 weight percent solids of which about 30 to 50 weight percent is sodium bisulfite and the balance essentially sodium sulfite.

References Cited

UNITED STATES PATENTS 3,273,961   9/1966   Rogers et al. _____ 23—178 X

FOREIGN PATENTS 134,555   11/1919   Great Britain.
627,815   9/1961   Canada.

OSCAR R. VERTIZ, Primary Examiner

G. T. OZAKI, Assistant Examiner

U.S. Cl. X.R.

23—2, 130